United States Patent
Kotsonis et al.

(10) Patent No.: US 10,295,323 B2
(45) Date of Patent: May 21, 2019

(54) APPARATUS, SYSTEM AND METHOD FOR BLASTING USING MAGNETIC COMMUNICATION SIGNAL

(71) Applicant: Orica International Pte Ltd, Singapore (SG)

(72) Inventors: Steven Kotsonis, Brunswick (AU); Byron Wicks, Alumy Creek (AU)

(73) Assignee: Orica International Pte Ltd., Singapore (SG)

( * ) Notice: Subject to any disclaimer, the term of this patent is extended or adjusted under 35 U.S.C. 154(b) by 0 days.

(21) Appl. No.: 15/129,145

(22) PCT Filed: Mar. 23, 2015

(86) PCT No.: PCT/AU2015/050121
§ 371 (c)(1),
(2) Date: Sep. 26, 2016

(87) PCT Pub. No.: WO2015/143501
PCT Pub. Date: Oct. 1, 2015

(65) Prior Publication Data
US 2017/0074630 A1    Mar. 16, 2017

(30) Foreign Application Priority Data
Mar. 27, 2014    (AU) .................................. 2014901099

(51) Int. Cl.
*F42D 1/055*    (2006.01)
*F42D 1/05*    (2006.01)

(52) U.S. Cl.
CPC ...................................... *F42D 1/05* (2013.01)

(58) Field of Classification Search
CPC ... F42D 1/055; F42D 1/02; F42D 1/04; F42D 1/05; E21B 43/1185; F42B 3/113
(Continued)

(56) References Cited

U.S. PATENT DOCUMENTS 3,166,015 A    1/1965    Tuve
4,632,031 A    12/1986   Jarrott
(Continued)

FOREIGN PATENT DOCUMENTS

AU    2015234708    10/2016
CL    200600155     1/2007
(Continued)

OTHER PUBLICATIONS

International Search Report, PCT/AU2015/050121, dated May 25, 2015 (4 pages).
(Continued)

*Primary Examiner* — Michael D David
(74) *Attorney, Agent, or Firm* — Nixon Peabody LLP

(57) ABSTRACT

An initiator apparatus (IA) for blasting, the IA including: a magnetic receiver configured to receive a through the earth (TTE) magnetic communication signal representing a command from a base station; a blasting controller, in electrical communication with the magnetic receiver, configured to generate response data in response to the command; and an electromagnetic (EM) transmitter system (ETS), in electrical communication with the blasting controller, configured to transmit the response data for the base station using a TTE electromagnetic (EM) signal.

18 Claims, 5 Drawing Sheets

(58) Field of Classification Search
USPC .................. 102/206, 215, 217, 201, 209
See application file for complete search history.

(56) References Cited

U.S. PATENT DOCUMENTS

| | | | | |
|---|---|---|---|---|
| 4,777,880 | A * | 10/1988 | Beattie | F42D 1/05 |
| | | | | 102/202 |
| 4,860,653 | A * | 8/1989 | Abouav | F42B 3/122 |
| | | | | 102/200 |
| 4,862,802 | A | 9/1989 | Streifer | |
| 4,869,171 | A * | 9/1989 | Abouav | F42B 3/122 |
| | | | | 102/206 |
| 6,173,651 | B1 * | 1/2001 | Pathe | F42B 3/122 |
| | | | | 102/200 |
| 7,568,429 | B2 * | 8/2009 | Hummel | F42B 3/113 |
| | | | | 102/206 |
| 7,929,270 | B2 | 4/2011 | Hummel | |
| 8,395,878 | B2 | 12/2013 | Stewart | |
| 8,955,441 | B2 * | 2/2015 | Schlenter | F42D 1/055 |
| | | | | 102/217 |
| 8,991,315 | B2 * | 3/2015 | Koekemoer | F42D 1/04 |
| | | | | 102/201 |
| 9,354,029 | B2 * | 5/2016 | Mace | F23Q 21/00 |
| 9,377,280 | B2 * | 6/2016 | Schlenter | F42D 1/055 |
| 9,581,422 | B2 * | 2/2017 | Preiss | E21B 43/1185 |
| 9,587,925 | B2 * | 3/2017 | Garcia | F42D 1/042 |
| 9,605,937 | B2 * | 3/2017 | Eitschberger | F42C 19/12 |
| 10,113,843 | B2 * | 10/2018 | Appleby | F42D 1/055 |
| 2005/0012499 | A1 * | 1/2005 | La Rosa | E21B 47/02 |
| | | | | 324/207.15 |
| 2007/0076459 | A1 * | 4/2007 | Limpkin | H01F 38/14 |
| | | | | 363/157 |
| 2011/0283705 | A1 | 11/2011 | Oliver | |
| 2013/0098257 | A1 | 4/2013 | Goodridge | |
| 2015/0241191 | A1 * | 8/2015 | Garcia | F42D 1/042 |
| | | | | 102/311 |
| 2017/0074625 | A1 * | 3/2017 | Appleby | F42D 1/055 |

FOREIGN PATENT DOCUMENTS

| | | |
|---|---|---|
| CL | 200701219 | 1/2008 |
| CL | 201602431 | 3/2017 |
| WO | WO 2000/72606 A2 | 11/2000 |
| WO | WO2002/099356 A2 | 12/2002 |
| WO | WO 2006/076777 A1 | 7/2006 |
| WO | WO2006/076778 A1 | 7/2006 |
| WO | WO 2007/124538 A1 | 11/2007 |
| WO | WO 2012/061850 A1 | 5/2012 |
| WO | WO 2012/149277 A2 | 11/2012 |
| WO | WO 2012/149584 A1 | 11/2012 |
| WO | WO 2013/082868 A1 | 6/2013 |
| WO | WO 2013/116938 A1 | 8/2013 |
| WO | WO2014/193833 A2 | 12/2014 |
| WO | WO 2015/143502 A1 | 10/2015 |

OTHER PUBLICATIONS

Expert Report on Utility Patent Application No. CL 201602432, dated May 17, 2018, with English translation (17 pages).

* cited by examiner

APPARATUS, SYSTEM AND METHOD FOR BLASTING USING MAGNETIC COMMUNICATION SIGNAL

RELATED APPLICATION

The present application claims priority to Australian Provisional Application No. 2014901099, filed on 27 Mar. 2014 in the name of Orica International Pte Ltd, and PCT Application No. PCT/AU2015/050121 filed on 23 Mar. 2015, the entire specifications of both are hereby incorporated by reference herein.

TECHNICAL FIELD

The present invention relates generally to methods of blasting, wireless electronic blasting systems (WEBS), and electronic communication with initiation apparatuses (IAs) in such WEBS.

Embodiments of the invention may be used in many applications including, for example, surface mining, underground mining, quarrying, civil construction, and/or seismic exploration on land or in the ocean.

BACKGROUND

Electronic blasting systems are widely used in mining and exploration to provide highly accurate controlled explosive blasts and blast patterns.

In blasting applications, conventional electronic detonators can communicate with a blasting control system, e.g., a blasting machine, using wired or wireless communication links. In existing blasting wireless systems, the wireless leg of the command path is often above the ground so that radio signals can be passed from the blasting machine to the above-ground wireless receivers and from there via a wire into the borehole to an electronic initiation device in the borehole. In such cases, two-way communication between the blasting machine and in-hole electronics allows diagnostic apparatuses external to the borehole to interrogate an in-hole device as to its condition. Such two-way communication may allow the condition of the in-hole device to be tested, and any instructions (e.g., a timing delay) that have been sent to the in-hole device to be confirmed (e.g., using a cyclic redundancy check).

A method of communication between an in-hole electronic initiation device and a blasting machine has been proposed using magnetic signals and magnetic sensors; however, magnetic-field-based systems for blasting typically need relatively large, high-powered transmission equipment to generate magnetic field fluctuations of sufficient strength to communicate with in-hole devices across a typical blasting field: for example, several hundred meters. It may be practical to provide sufficiently powerful transmitting equipment for a blasting machine above the ground or within underground access areas; however, it is not generally practical to provide an in-hole device with the necessary antenna and power to communicate back to a blasting machine using a magnetic signal. Accordingly, once an in-hole unit has been deployed, the above-ground portions of the magnetic system may not be able to discover the status or condition of the in-hole units, or confirm that an in-hole unit has correctly received information sent to it.

It is desired to address or ameliorate one or more disadvantages or limitations associated with the prior art, or to at least provide a useful alternative.

SUMMARY

In accordance with the present invention, there is provided an initiator apparatus (IA) for blasting, the IA including:

a magnetic receiver configured to receive a through the earth (TTE) magnetic communication signal representing a command from a base station;

a blasting controller, in electrical communication with the magnetic receiver, configured to generate response data in response to the command; and an electromagnetic (EM) transmitter system (ETS), in electrical communication with the blasting controller, configured to transmit the response data for the base station using a TTE electromagnetic (EM) signal.

The present invention also provides a wireless electronic blasting system (WEBS) including the IA.

The present invention also provides a method of blasting including the steps of:

receiving a TTE magnetic communication signal representing a command for an initiator apparatus (IA) from a base station;

generating, by the IA, response data in response to the command; and transmitting the response data for the base station using a TTE electromagnetic (EM) signal.

BRIEF DESCRIPTION OF THE FIGURES

Preferred embodiments of the present invention are hereinafter described, by way of example only, with reference to the accompanying drawings, in which.

DETAILED DESCRIPTION

Definitions

Figure 1:
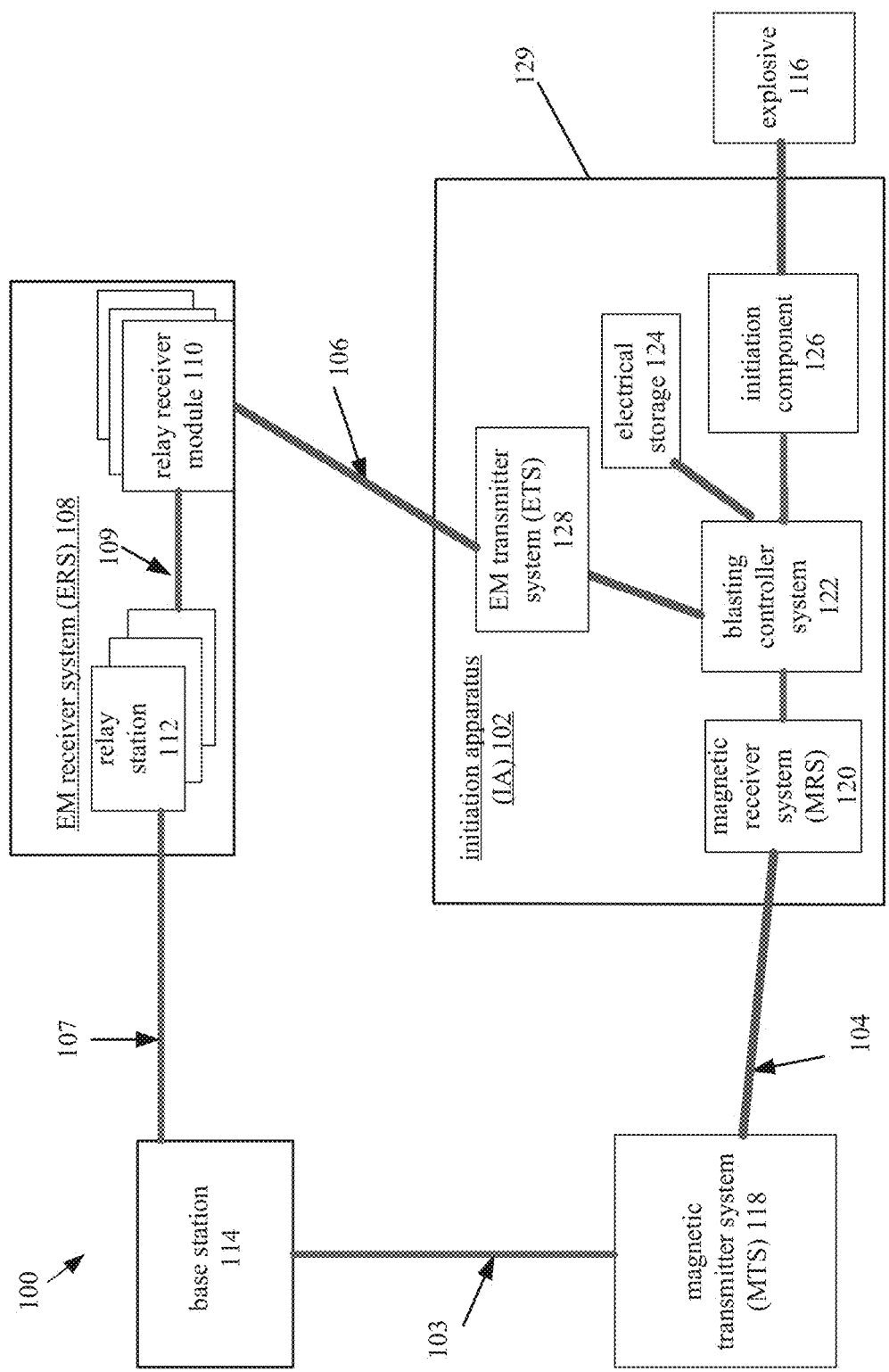
FIG. 1 is a block diagram of a wireless electronic blasting system (WEBS) including one or more initiating apparatuses (IAs)

As described herein, a wireless electronic blasting system (WEBS) for blasting may be a system for controlling and initiating a blast, for example, using buried explosives in surface mining, underground mining, quarrying, civil construction, and/or seismic exploration on or in land or in the ocean.

An initiating apparatus (IA) as used herein may be referred to as a wireless initiation apparatus, a wireless initiating device (if it is a one-piece unit in a housing), a wireless receiver, or, if intended to be destroyed by the blast, a disposable receiver ("DRX").

The term "earth" as used herein may refer to earth, ground, rock, soil, sand, and/or construction materials, e.g., concrete/cement, etc., in which the IA may be buried or placed for blasting in explosives in surface mining, underground mining, quarrying, civil construction, and/or seismic exploration on land or in the ocean.

Magnetic sensors as used herein may be referred to as "detectors" or "magnetometers" and may operate based on magnetic induction (MI) (according to Faraday's law) or as quasi-static magnetic field detectors (e.g., magneto-resistive sensors or Gaussmeters). "Sensing" the magnetic field may also be referred to as "measuring" or "detecting". The magnetic field sensors may be triaxial magnetometers.

A magnetic transmitter system and a magnetic receiver system as described herein operate based on modulation of magnetic fields generated by the magnetic transmitter system and detected by the magnetic sensors in the magnetic receiver system. The magnetic-field modulation may include frequencies, as measured in hertz (Hz), of about 50 Hz, less than about 50 Hz, between about 5 Hz and 50 Hz, or below about 5 Hz.

The terms electromagnetic (EM) receiver, EM transmitter, EM signal(s), EM range, EM frequencies, and EM propagation refer to the use of far-field radio frequency (RF) modulation and detection techniques, as known in the art. In embodiments, the EM receiver, transmitter, and/or transceiver utilize radio frequencies (RF). In embodiments, the EM frequencies include frequencies in the range of 300 Hz to 300 gigahertz (GHz). The EM frequencies may include ultra low frequencies (ULF) in the range 300 Hz to 3000 Hz. The EM frequencies may include very low frequencies (VLF) in the range 3 to 30 kilohertz (kHz). The EM frequencies may include low frequencies (LF) in the range of 30 to 300 kHz. The EM frequencies may be below 120 kHz. The EM frequencies may be below 70 kHz. The EM frequencies may be above 1 kilohertz (kHz) or above 20 kHz. The EM frequencies may include 50 kHz.

The terms "wired communication", "wired communication link" and "wired connection", as used herein, generally refer to the use of a connective wire, electrical conductor, cable or other like connection to transmit signals from a transmitter to a receiver (or between transceivers) over a distance. The terms "wireless communication", "wireless communication link" and "wireless connection", as used herein, generally refer transmitting signals from a transmitter to a receiver (or between transceivers) over a distance using magnetic and/or electric fields, electromagnetic waves (including radio-frequency waves), or acoustic/seismic waves, thus allowing communications from the wireless transmitter to the wireless receiver (or between wireless transceivers) without the need to form an enduring physical connection (e.g., a wire or conductor) between them. A receiver as described herein functions to receive wired or wireless signals, data, or transmissions. A transmitter as described herein functions to send wired or wireless signals, data, or transmissions. A transceiver as described herein may function either as a receiver or transmitter or may perform both functions.

Wireless Electronic Blasting System (WEBS)

As depicted in FIG. 1, a WEBS 100 includes a base station 114, a magnetic transmitter system (MTS) 118, at least one initiating apparatus (IA) 102, and at least one electromagnetic receiver system (ERS) 108. These components may be configured in various manners and communicate via various channels to form the WEBS 100.

The base station 114 communicates with the MTS 118 via wired or wireless communication along an initial link 103. The MTS 118 communicates to the one or more IAs 102 via magnetic signals along a forward link 104. The IA 102 is configured to receive the magnetic signals and, if needed, reply back to the base station 114 via the ERS 108 along a back link 106 using wireless signals, particularly EM signals based on EM propagation. The EM signals are used to transmit electronic digital data in packets. The IA 102 is configured to send response data to the ERS 108: these response data are generated in response to commands from the base station 114, as described in more detail hereinafter. As a consequence, these EM signals may also be referred to as "response signals". In some embodiments, the base station 114 may be configured to communicate via base link 107 to the ERS 108, and the ERS 108 may be further configured to transmit communications to the IA 102 over the back link 106.

As noted above, in the WEBS 100, the one or more IAs 102 are located in one or more respective boreholes in the earth, and receive communications from the base station 114 via the MTS 118 and, in some embodiments, from the base station 114 via the ERS 108. The IAs 102 may be in respective separate boreholes, or one borehole may include a plurality of explosive columns, separated by stemming material, each with an IA 102. Each IA 102 includes a housing 129 around a main body of the IA 102 (including all or most of the components), and the housing is configured to allow insertion and burial in a borehole, and may have a diameter of less than 100 mm, or around 60 mm. When base station 114 sends the communications over the initial link 103 to the MTS 118, the MTS 118 then sends the communications via the forward link 104 by generating and modulating a magnetic field that extends TTE to a magnetic receiver system (MRS) 120 of the IA 102. The communications from the MTS 118 include initiation commands, and may include non-initiation commands. In some embodiments, the base station 114 may send non-initiation commands via the base link 107 to the ERS 108 and on to the IA 102 via back link 106. The initiation and the non-initiation commands are described hereinafter.

As depicted in FIG. 1, the ERS 108 (which may be referred to as a "repeater") includes at least one relay receiver module 110 able to detect the EM signals from the IA 102 via the back link 106, and one or more relay stations 112 in communication with each relay receiver module 110 (via a wired or wireless link) using an inter-repeater link 109. In embodiments, the back link 106 may be two-way (and be referred to as a "two-way back communications link") and the ERS 108 may include an EM transmitter or EM transceiver (in the relay receiver module 110) for transmitting EM signals along the back link 106 to the IA 102. Thus, the relay receiver module 110 may function as a transceiver, both receiving and sending information along the back link 106.

An effective transmission range of the EM signals TTE along the back link 106 (i.e., from the IA 102 to the ERS 108)—referred to as an EM range 132—may be up to 100 metres (m) in some earths, or up to 50 m, 25 m or 20 m in other earths. The operational EM frequencies in the EM signals may be selected based on a required maximum path loss (e.g., 40 decibels or dB), and a required effective transmission range, for an absorption coefficient of the earth. The EM frequency may be an RF frequency between 1 kHz and 120 kHz, between 20 kHz and 70 kHz, or around 50 kHz, as mentioned hereinbefore.

Figure 2:
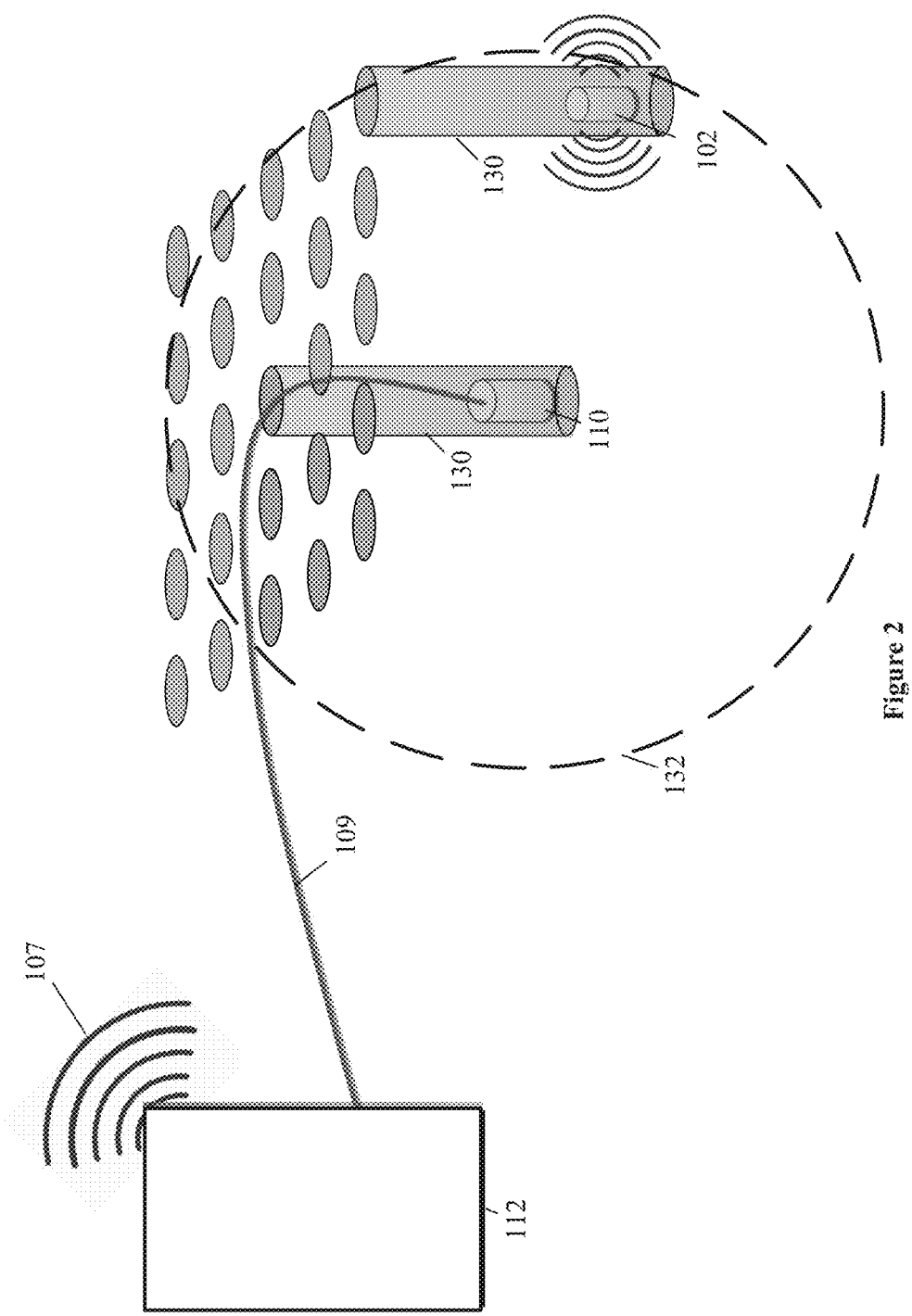
FIG. 2 is a sketch of the IAs in boreholes down from a surface and a relay in one of the boreholes.
Figure 3:
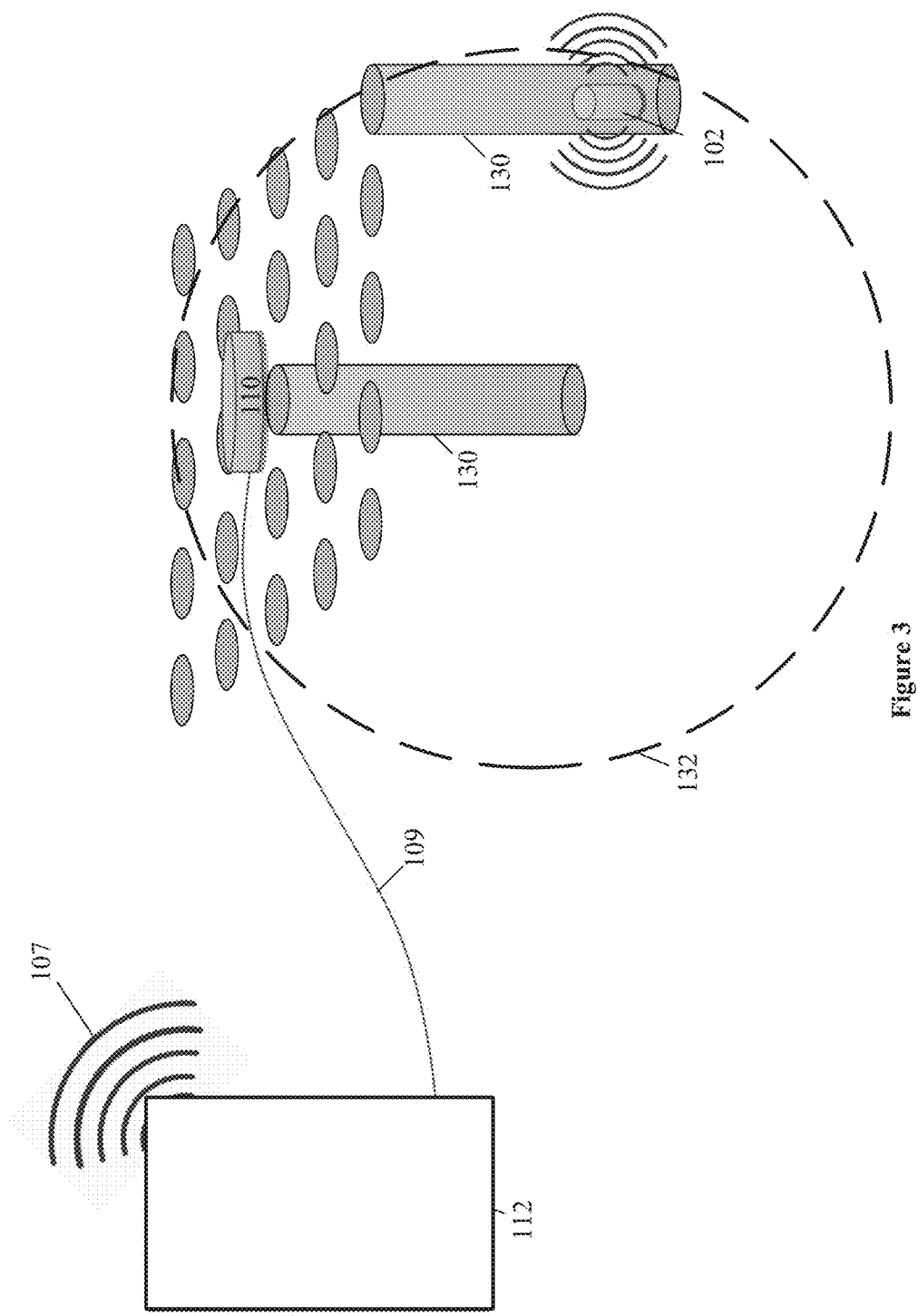
FIG. 3 is a sketch of the IAs in boreholes down from a surface and a relay on the surface.

The WEBS 100 can be configured for surface use (e.g., in surface mining), as shown in FIGS. 2 and 3. A mine site may include an open mining bench with boreholes 130 drilled vertically. Each IA 102 can be primed with a booster prior to being loaded in one of the boreholes 130. The IAs 102 may be in separate boreholes, or one borehole may be an explosive column with a plurality of the IAs 102. After loading the IAs 102, bulk explosive is loaded into the holes 130. The relay receiver module 110 is deployed on the site within the EM range 132 of the IAs 102. The relay receiver module 110 is deployed in one of the holes 130, as shown in FIG. 2, or on the surface, as shown in FIG. 3. If deployed on the surface, the relay receiver module 110 and the relay station 112 can be deployed after the blasting is clear site traffic etc., for ease of cable placement (including the inter-repeater link 109).

Figure 4:
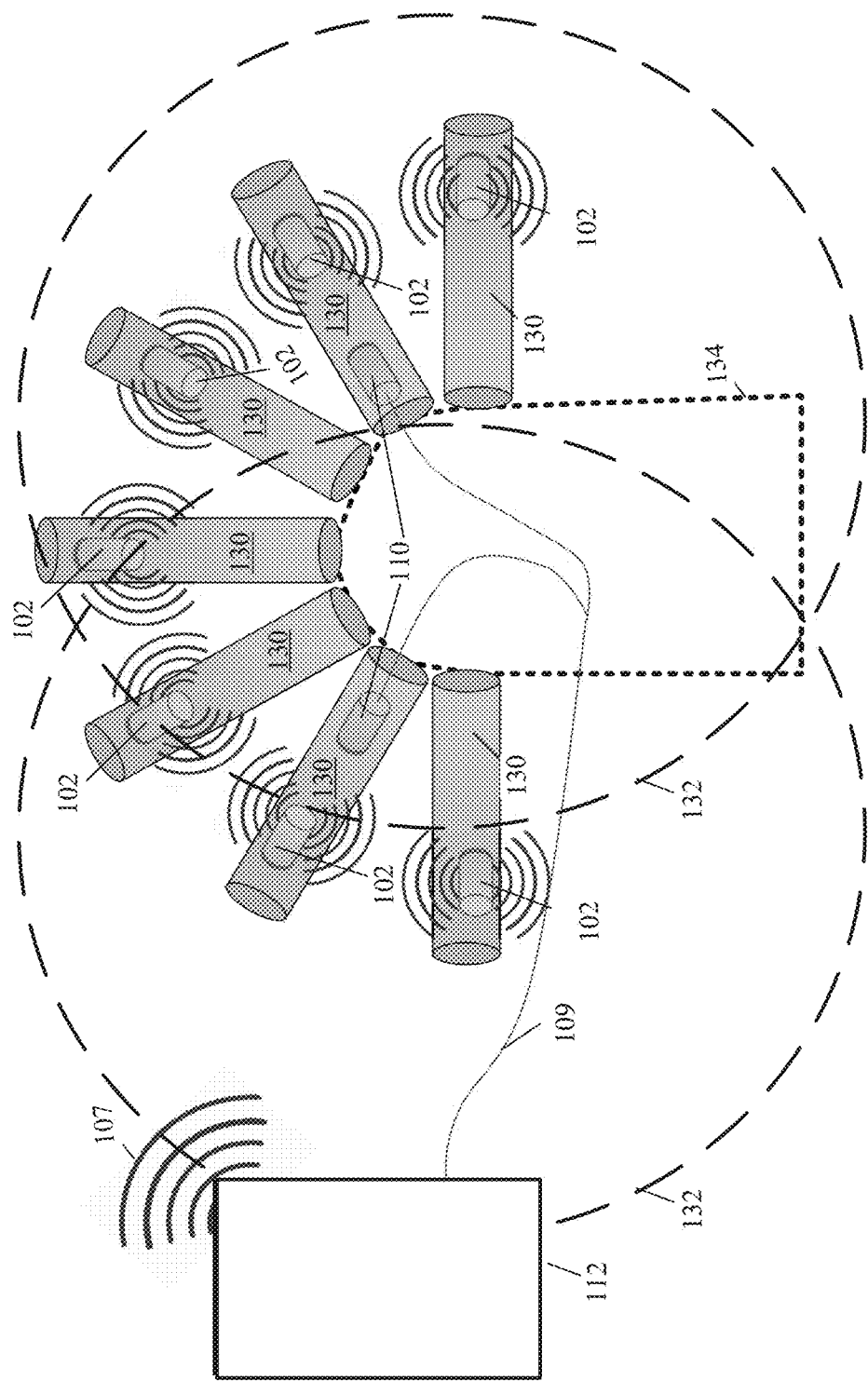
FIG. 4 is a sketch of the IAs in boreholes off a tunnel with a plurality of relay stations.
Figure 5:
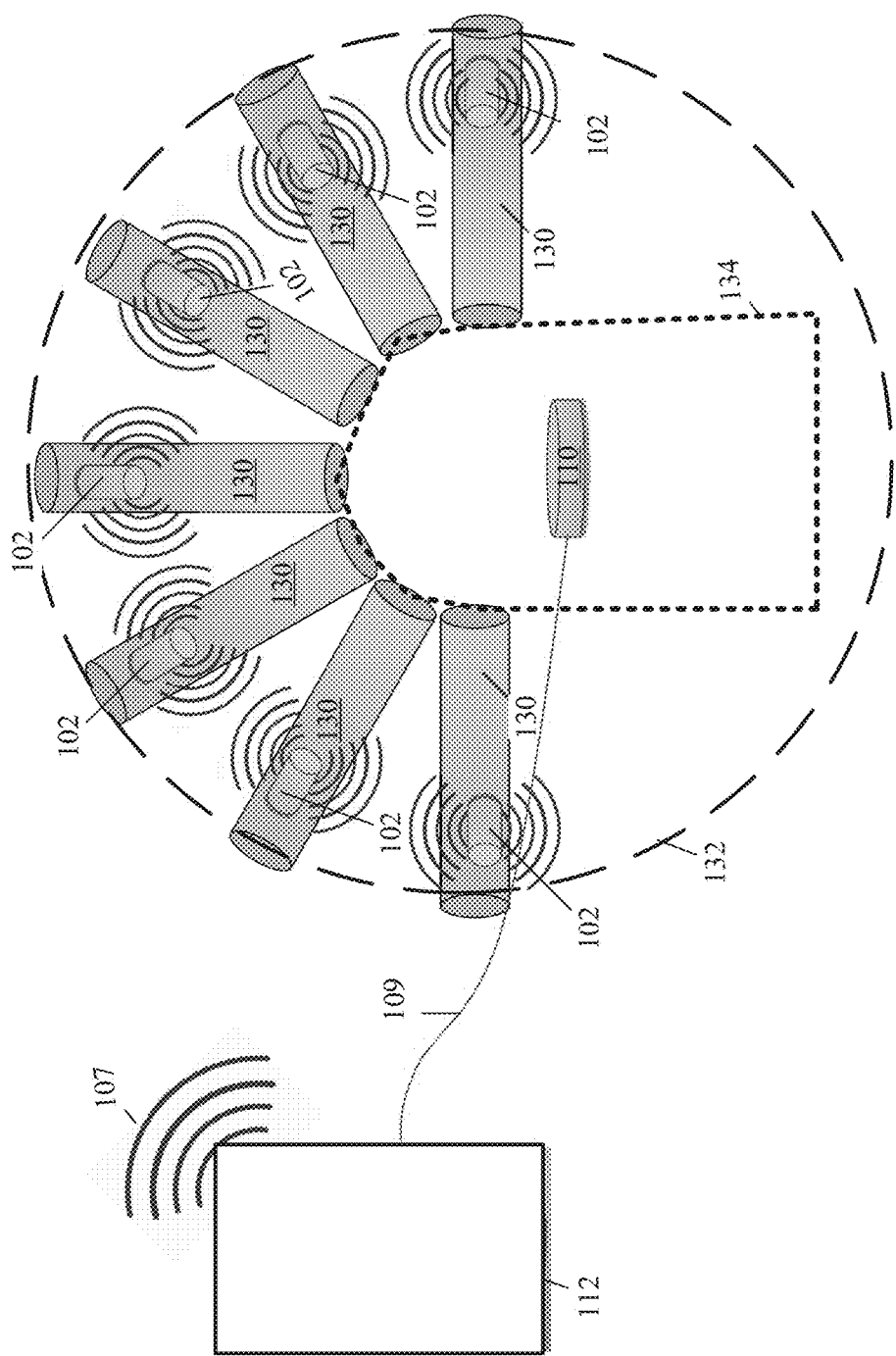
FIG. 5 is a sketch of the IAs in boreholes off a tunnel with a single relay station.

In embodiments, the WEBS 100 can be configured for tunnel use (e.g., in underground mining), as shown in FIGS. 1D and 1E. In tunnel use, the relay receiver module 110 is placed in a tunnel 134 within the EM range 132 for all of a group of the IAs 102. The tunnel 134 can include a plurality of the relay receiver modules 110, e.g., placed along the tunnel 134, or placed in respective holes 130 off the tunnel 134, as shown in FIG. 3. The tunnel 134 can include a single relay receiver module placed in a main portion of the tunnel 134, as shown in FIG. 4. The relay receiver modules 110 can connect via the inter-repeater link 109 cables to the relay station 112 at a safe distance from the IAs 102.

Base Station & Magnetic Transmitter System (MTS)

As noted above, the base station 114 can communicate with the MTS 118 via wired signals or wireless signals (including EM signals). The MTS 118 can be located with the base station 114, e.g., on a surface above an underground mine at a safe location. The MTS 118 can communicate to the IA 102 using the magnetic signals, which may be magneto-induction (MI) signals. The base station 114 can include a wired or wireless transmitter for transmitting the wired or the wireless signals to the MTS 118. The base station 114 can also have a wired or wireless receiver, receiver and transmitter, or transceiver for receipt of communication along base link 107 from the ERS 108, and, in embodiments, return communication from the base station 114 to the ERS 108.

Any suitable MTS 118 can be used for transmitting the magnetic signals. The MTS 118 can include a current source and one or more conductive coils sufficient to generate a magnetic field in the earth at the location of the IA 102, and/or at locations of all IAs 102 in a preselected blasting pattern. The magnetic field at the location of the IA 102 can be modulated to represent a specific command, and the IA 102 can be configured to demodulate the magnetic communication signal to determine the command. For security purposes, the magnetic communication signal may be encoded using predetermined encoding scheme, and decoded by the controller using the predetermined encoding scheme.

The commands (which may be referred to as "blasting commands" or "instructions") from the base station 114 for communication to the IA 102 can include, for example, any one or more of the following:

a ping command instructing the IA 102 to generate a ping-detection response (in the response data) representing that the ping command has been received by the IA 102, and/or that the condition of the IA 102 is satisfactory for later firing;

a diagnostic command instructing the IA 102 to generate and send diagnostic data in the response data (the diagnostic data are described in further detail hereinafter), wherein different diagnostic commands may be used for respective different diagnostic statuses;

a response delay command instructing the IA 102 to delay for a selected response delay time (selected by the base station 114) before transmitting the response data over the back link 106;

a time synchronisation (sync) command with data instructing the IA 102 to synchronize its clock or timer with a base station time (this may synchronise the clocks of all IAs 102);

a time-delay command, providing a selected time or time delay, determined based on a blasting pattern, for the IA 102 to count before initiating its explosive;

an arm command to arm the IA 102;

a fire command, for the IA 102 to commence a countdown to initiation; and other commands as used in existing electronic blasting systems (e.g., the i-kon™ system from Orica).

Any command can include an initiator identifier (IID) that identifies one of the IAs 102 in the blasting pattern, and the identified IA 102 can generate and send relevant response data if it has a stored IID matching the command IID. Alternatively, or additionally, any command may include a group ID (GID) such as is described in Patent Cooperation Treaty Application Publication No. WO2010085837 (entitled: "Selective Control Of Wireless Initiation Devices At A Blast Site"), which is hereby incorporated herein by reference in its entirety. IAs 102 matching the GID in the command may generate and send relevant response data to the ERS 108. The initiating commands are those that lead to initiation or detonation of the explosive 116, e.g., the fire command. The non-initiating commands are those that do not cover initiation or detonation, and are therefore less dangerous to send, e.g., the ping command, the diagnostic command, the response delay control commands, the time sync command.

Initiating Apparatus (IA)

As shown in FIG. 1, the IA 102 may include: a magnetic receiver system (MRS) 120, which includes one or more magnetic field sensors for detecting the magnetic TTE communication signals; an electronic blasting controller (including at least one electronic microcontroller), which is referred to as a "blasting controller system" (BCS) 122, connected to the MRS 120 for receiving the commands sent using the forward link 104, and for controlling functions of the IA 102; an electrical energy storage 124 (e.g., a battery and/or capacitor) for powering the components of the IA 102; an initiation component 126 connected—at least indirectly—to the BCS 122; and an explosive 116 (e.g., a booster charge) capable of being initiated by the stored energy from the electronic storage 124. The MRS 120 is configured to detect the magnetic communication signal, and to generate a corresponding electronic signal for the BCS 122: the BCS 112 is then configured, based on stored electronic instructions and codes, to determine the command from the corresponding signal.

The initiation component 126 may be a detonator that receives an electrical charge from the electrical storage 124, or an electromagnetic or optical source that ignites the explosive 116 using directed power from the electrical storage 124. An example optical source operating as an initiation component may include a laser as described in U.S. Pat. No. 8,272,325 (dated 25 Sep. 2012). In embodiments, the IA 102 may control an electronic detonator, which is configured to receive arm, fire and time-delay commands from a commercially available blasting machine incorporated into the base station 114, and to activate the explosive charge (via the explosive 116) after a pre-programmed delay.

The IA 102 may also include an EM transmitter system (ETS) 128 that is electronically in communication with, and connected—at least indirectly—to the BCS 122. The ETS 128 includes one or more EM antennas configured to generate the EM signals for the back link 106. The ETS 128 may be referred to as a "source". These antennas (referred to as "IA antennas") may be coil antennas tuned to a selected transmission frequency using a tuneable matching network 222 (e.g., including a switching capacitor resistive-capacitive tank, or a current driver) of the transmission component 218. The IA antenna may be single solenoid coils with a cross sectional area that is as large as possible while remaining inside a housing of the IA 102, e.g., a 60-mm diameter. These coils may have, for example, between 50 and 500 turns, and a high quality factor (Q).

The IA 102 may only be capable/required to transmit EM signals (representing the response data, described in more detail below) to the ERS 108 via the back link 106 without being capable/required to transmit directly to the base station 114. As the electrical power used to generate EM signals requires less electrical power than that used to generate magnetic signals, the energy storage required by the IA 102 to power the back link 106 may be limited to levels lower, thereby ameliorating safety concerns.

In some embodiments, both the IA 102 and the ERS 108 include both a receiver and a transmitter, or a combination forming a "transceiver component", capable of both sending and receiving EM signals along the back link 106. The EM transmitter and receiver, or transceiver, of the ERS 108 may be located in the relay receiver module 110, and may share the antenna in the relay receiver module 110. The IA 102 may include an EM receiver, or an EM transceiver configured to receive return EM signals along the back link 106 from the ERS 108 TTE. The antenna of the IA 102 may be contained inside the IA 102, or may extend from a main body of the IA 102, and be electrically connected to the BCS 122 by an antenna cable (including an electrical conductor or wire) extending from the main body of the IA 102: the antenna cable carries signals between the main body and the antenna to send and receive (in some embodiments) the EM signals. The main body of the IA 102 includes the MRS 120, the BCS 122, the electrical storage 124, and the initiation compartment 126. In embodiments, the IA antenna may extend about ½ way up the length of the borehole. In other embodiments, the IA antenna may extend up about the full length of the borehole to the collar of the borehole.

In embodiments, the IA 102 may be configured as a plurality of separate and connectable modules, including one or more of the following: a sensor module; an initiator module (including an initiator or a detonator); and an EM transmitter signalling module. The sensor module may include the MRS 120, blasting controller system 122, and a main portion of the electrical storage 124. The initiator module may include the initiation component 126. The EM transmitter signalling module may include the EM transmitter system 128, and a signalling portion of the electrical storage 124. Having a plurality of separate electrical storage portions in the IA 102 (i.e., the main portion and the signalling portion in different modules) may reduce power draw from the main source during diagnostic communications by the IA 102, thus maintaining sufficient power to fire. The IA 102 may also include a safety module, to ameliorate false signalling or power transfer to the initiation module that might lead to undesirable initiation or detonation. The sensor module and the initiation module can be connected both mechanically (e.g., bayonet, or clip or threaded), and electrically (e.g., using a 2 or 4 pin connector) or optically, so that the sensor module can transmit the commands to the initiation module, and so that the sensor module and the initiation module can be joined just prior to placement in a hole (e.g., for safety reasons). In order to provide communication to the ERS 108, the EM transmitter signalling module can be connected to the sensor module and/or the initiation module both mechanically, and electrically or optically, so that transmitter module can receive signals from the sensor module, based on the received commands. When assembled to form the IA 102, the sensor module, initiation module and EM transmitter signalling module can fit in the overall housing 129 that is configured for insertion and burial in a hole. In these separable embodiments, the EM transmitter signalling module may be coupled to existing electronic detonators or electronic initiators.

Signals and Noise

As noted above, there may be four paths along which communication may occur in the WEBS 100: (A) the initial link 103 from the base station 114 to the MTS 118; (B) the forward link 104 from the MTS 118 to the IA 102; (C) the back link 106 from the IA 102 to the ERS 108; and, (D) the base link 107 between the ERS 108 and the base station 114. Communication along the initial link 103 may be unidirectional, and may be via a wired or wireless link. The forward link 104 may be unidirectional, and occur via magnetic signals. The back link 106, whether operating only one way (only from the IA 102 to the ERS 108) or two ways (back and forth between the IA 102 and the ERS 108), occurs via EM signals. The base link 107 may be used either exclusively for receipt of EM signals from the ERS 108 or for communication back and forth between the ERS 108 and the base station 114.

In embodiments, the IA 102 may receive communications from the base station 114 over two different paths: the forward link 104 and the back link 106. As noted above, the base station 114 may communicate via magnetic signals from the MTS 118 to the IA 102, and the base station 114 may send communications via the ERS 108 along back link 106 using EM signals. The IA 102 may only send response data along one of these paths, back link 106, to the ERS 108 and on to the base station 114.

In embodiments where the communication along the back link 106 is two-way, signals from the base station 114 via the ERS 108 may be limited to the diagnostic or non-initiation signals. In such an embodiment, signals received from the base station 114 via the MTS 118 may be limited to initiation signals. This communication structure may reduce risks of explosions due to errant signals over the back link 106, or risks due to spurious EM signals (e.g., noise, or EM interference) on the site.

The response data (which may also be referred to as "feedback data") may be generated to represent any relevant form of communication, including any one or more of:
  acknowledgement data representing acknowledgement of receipt of a command at the IA 102, which may include: a simple acknowledge (ACK) or not acknowledge (NACK) signal tone;
  a command ID identifying the received command, which may include confirmation that the command was received without error (e.g., based on a cyclic redundancy check);
  receipt time data representing when commands have been received by the IA 102 (the receipt time data may be combined with the acknowledgement data);
  state data representing a current state of a state machine in the IA 102 (e.g., ARMED, DISABLED, SAFE, etc.);
  status data representing a current status of the IA 102 and/or statuses of components of the IA 102, including: a status of the power supply 214 (e.g., operational, non-operational), a status of the forward link 104 (e.g., operational, non-operational), a status of the electrical storage 124 (e.g., operational, non-operational), a status of the initiation component 126 (e.g., operational, non-operational);

battery data representing one or more measures of remaining electrical power stored in the IA 102 (e.g., as mentioned hereinbefore, there may be separate power supplies—also represented by electrical storage 124—for the initiation component 126 and for the ETS 128);

error data representing error codes generated by the IA 102, which may include one or more of the errors and error codes (which, in embodiments, may be, at least 16-bits long);

condition data representing a condition of the IA 102, to determine its potential for initiation, which may include a resistance of a fuse bridge wire, voltage on a firing capacitor, and/or resistance of a laser initiator, or error flags if these measures are out of stored ranges, e.g., according to a predetermined testing routine performed by the IA 102;

performance data (which may be referred to as "metrics data") representing performance measures of the IA 102, including metrics for communication, e.g., received magnetic signal strength, Received Signal Strength Indication (RSSI), received signal-to-noise ratio, or bit error rate for the commands;

environment data from monitoring an environment of the IA 102, including parameter values for moisture, temperature, vibrations, etc., using sensors included in the IA 102 (e.g., moisture sensors, temperature sensors, vibration sensors, etc.);

identifier (ID) data representing an identifier of the IA 102 e.g., a quasi-unique initiator identifier (IID) that identifies one of the IAs 102, and/or the group ID (GID) for a group of IAs 102;

stored setting data in the IA 102 relating to a selected blast, coordinates, row number, hole number and/or logging sequence; and initiator timing data representing initiator timing (e.g., detonator timing).

In example sites, highly attenuating rock may be located in the communications path, e.g., water saturated porous sedimentary rock with an attenuation constant of 200 times or greater than 20 dB, per meter. To achieve the required transmission distance for the back communications link 106, while limited by a small power supply in the IA 102, may require relatively long transmission times, e.g., greater than 3 to 10 mins, even for limited data rates (bit rates).

In embodiments, the EM signals generated by the IA 102 may be low bit-rate, e.g., a single tone (i.e., central or carrier frequency) per signal; may be unique for each IA 102; and may correspond to a simple command, e.g., a successful acknowledgement or error. The packets of data may be generated using, for example, on-off keying. The period for receipt of an EM packet over the back link 106 may be greater than about 1 min, or between about 3 and about 10 mins. In examples, with a period of about 3 minutes, packets may include a single bit (e.g., 0 or 1), or fewer than 5 bits, or fewer than 8 bits, or fewer than 16 bits, or at least 16 bits.

Typical noise sources in a mine may be constant, or have time-dependant amplitude: examples include power lines, heavy machinery, and communications equipment. To ameliorate deleterious effects of these noise sources on the back communications link 106, the ETS 128 may use frequency hopping or shifting to resist interference, especially narrow-band interference. For example, multiple frequencies could be selected for each IA 102 in a selected group of IAs 102, and each IA 102 could transmit on the most available frequency (e.g., based on signal strength or interference) or on all available channels. The IA 102 may send test signals along the back link 106, and receive corresponding test response signals from the ERS 108, to determine the most available frequency. The relay receiver module 110 and/or the ETS 128 (when operating as a receiver in the two-way back link embodiments) may filter pre-determined noise sources, as described hereinafter.

In applications with a plurality of IAs 102, the IAs 102 may transmit at different respective EM frequencies (i.e., in parallel). Such a parallel modulation scheme may allow for all deployed IAs 102 to respond at once, thus the communication time may be limited regardless of the number of IAs 102 being detected, e.g., requiring only 3 to 10 minutes (mins) for all IAs 102 in a group. In other applications, the EM signals from respective IAs may be time-delayed for different selected response delay times so that an identity of each IA 102 can be determined (in the base station 114) from the received response time, and/or from the sequence and ordering of the received EM response signals. Some applications may include a first group of IAs 102 configured to transmit in parallel or series to a first relay receiver module 110, and a different second group of IAs 102 configured to transmit in parallel or series to a second relay receiver module 110, e.g., as shown in FIG. 4.

The ERS 108 may be configured to use frequency domain analysis to detect the different respective EM frequencies (which may be referred to as "tonal peaks") of the IAs 102. Spacing of the tonal peaks may be selected to be from, for example, about 2 to about 20 Hertz (Hz). The ERS 108 may include noise filters, including frequency filters that are configured to reduce EM noise that is not preselected transmission frequencies of the IAs 102 in use. The relay receiver module 110 may include bandpass filters with selected pass bands based on environmental noise at the site. Transmission frequencies of the IAs 102 in use may be selected to differ from predetermined frequencies of EM noise sources on the site, thus allowing the ERS 108 to differentiate in frequency between EM noise and the EM signals from the IAs 102.

The state of the IA 102 may be controlled by a state machine in the BCS 122, e.g., providing a hibernation mode, a listening mode, an armed mode, and a firing mode (etc.).

Electromagnetic Receiver System (ERS)

The EM receiver 108 is depicted in FIG. 1 and, as discussed above, includes the relay stations 112 and the relay receiver module 110. The relay receiver module 110 of the ERS 108 may include a wired interface for connection to one or more wires in the conductive cable for wired communication along the inter-repeater link 109 from the relay receiver module 110 to the relay station(s) 112. Alternatively, the relay receiver module 110 may be connected using a cable, or wires, or a wireless link, to the base station 114 directly, using the base link 107, depending on the configuration of the site. The ERS 108 includes a connection interface for communication along back link 106, as described hereinbefore.

The relay receiver module 110 can be disposable, e.g., expendable during a blast. The relay receiver module 110 can allow for detection of the EM signal within, for example, about 50 m to about 100 m of the buried IAs 102. Multiple relay receiver modules 110 can be used to cover a large operational area on a site.

The relay receiver module 110 includes at least one antenna capable of receiving the EM signal from the IA 102. This antenna may be a conductive coil with a matching network (to allow for resonant detection). The at least one antenna may include a plurality of antennas placed in different orientations to detect the EM signals with different polarizations and orientations.

As described above, the relay receiver module 110 includes an EM receiver with the antenna for receiving the EM signals. The relay receiver module 110 includes an electronic processor to decode the received EM signal and to extract the response data; alternatively, the relay receiver module 110 may simply amplify and pass on (i.e., "relay" or "boost") the response signals. The relay receiver module(s) 110 and the relay station(s) 112 may include interfaces to connect to each other and to the base station 114: these interfaces may include a wired transmitter for a wired interface (e.g., using a cable, Ethernet™, etc.) or a wireless transmitter for a wireless interface (e.g., using WiFi™, ZigBee™, magnetic induction, etc.). The inter-repeater link 109 and/or the base link 107 may use in part an existing infrastructure repeater that uses pre-existing communications networks on the site, e.g., a leaky feeder cable, an Ethernet cable, or existing mine communications systems. Each of the relay stations 112 may include a battery power supply.

The relay receiver module(s) 110 and/or the relay station(s) 112 may generate relay response data representing performance of the EM system, including, for example, times at which the EM signals are detected, the identification of the IAs 102 from which they originate, and any system diagnostics (e.g., including a Signal-to-Noise ratio for each EM signal). The relay receiver module(s), the relay station(s) 112, and/or the base station 114 may extract the response data from the response signals, e.g., by storing and applying a preselected demodulation scheme that matches the modulation scheme (or protocol) used in the IA 102.

Method of Blasting

A method of, or for, blasting using the WEBS 100 includes: a setup phase, a testing phase, and a blasting phase.

The setup phase can include the following steps:
deploying the base station 114 and MTS 118 at a safe location (which may be, for example, protected from fly-rock or other explosive hazard, out of fly-rock range, etc.) on a site within the magnetic range of pre-selected firing positions of selected IA 102 locations in a pre-selected blast pattern;
programming a plurality of IAs 102;
placing or loading the IAs 102 into the pre-selected firing positions;
deploying the relay receiver module(s) 110 within EM range 132 of the IAs 102;
deploying the relay stations 112 within communications range (e.g., wired or wireless) of the relay receiver modules 110 and of the base station 114; and
loading the boreholes with explosives.

The testing phase can include the following steps:
the base station 114 transmitting a command to the MTS 118 or to the ERS 108;
the MTS 118 transmitting the command to the IAs 102 via the forward link 104, or the ERS 108 transmitting the command to the IAs 102 via the back link 106;
the IAs 102 each receiving the TTE magnetic communication signal representing a selected one of the commands from a base station;
the IAs 102 each processing the magnetic communication signal to determine the command;
the IAs 102 each generating the response data based on the command;
the IAs 102 each generating and transmitting (in parallel or in series) the response data to the ERS 108 using the EM signals;
the ERS 108 transmitting the response data to the base station 114; and
the base station 114 processing the received response data, which may include confirming correct receipt of the command signals, e.g., correct receipt of a timing signal.

The blasting phase can include the following steps:
clearing the site of personnel and valuable equipment;
the base station 114 generating an initiating command for commencing the blasting, and sending this initiating command to the MTS 118;
the MTS 118 transmitting the initiating command to the IAs 102 via the forward link 104; and
the IAs 102 each receiving and processing the initiating command to initiate detonation when each countdown (based on the previously received timing information) is complete, thus effecting the blasting.

The steps in the testing phase can be repeated a plurality of times for different commands, e.g., a condition report command may be followed by a timing command, and then another condition report command.

The step of transmitting the EM signal can include the steps of:
each of the IA 102 selecting the transmission frequency (e.g., a central frequency or a carrier frequency) for the EM signal, e.g., based on a time chart (frequency versus time) and a system time from the clock 210, and based on the IID;
each the IA 102 modulating the response signal using the selected transmission frequency to generate the EM signal; and
the ERS 108 detecting the response signal by demodulating at the selected transmission frequency (where the selected transmission frequency for each of the IAs 102 is predetermined in a schedule, or where the ERS 108 monitors all frequencies across a selected range, including all IAs 102 in the blast, simultaneously).

Applications

In use, a two-way communication method using the two different channels provided by the WEBS 100 allows:
a user (e.g., a system operator) to issue a command from the base station 114;
the IA 102 to receive the command via the forward link 104, or via the back link 106;
the IA 102 to activate and generate the response data in response to the command;
the IA 102 to send the response data using the EM signals to the relay receiver module 110 via the back link 106;
the relay receiver module 110 to send the response data to the base station 114 via the relay station(s) 112; and
the base station 114 to generate and present the response data to the user, e.g., to confirm correction operation of the IA 102.

The WEBS 100 can also ameliorate some of the challenges faced in prospecting, for example, for oil and/or gas. Leg-wire damage, whether intentional or unintentional, is a key failure mode for explosive detonation during seismic prospecting for oil and gas. This is worsened by the fact that explosives placed for performance of a seismic survey can be left in-place (i.e., slept) for extended periods (e.g., many months), far beyond those usually used for explosives in other activities, e.g., mining, quarrying etc. Explosives that fail to detonate, for example during a seismic survey, must be reported to various authorities as abandoned, along with documented map location(s).

Although wireless blasting provides a clear advantage for seismic prospecting of oil and gas as it removes leg-wire damage as a cause for detonation failure, the current state of the art does allow any information to be communicated from the buried explosive device. The WEBS 100 may overcome this disadvantage by providing a means for communication of, for example, status information. Further, the back-channel signal may be useable as a beacon for identification of the explosive device in the future, or further, as a warning beacon to suitably enabled devices, for example oil and gas drills.

An option can be envisioned for communicating out of the borehole via temporary wires (which may be referred to as "leg wires") from the IA 102 to a repeater station at the collar of the borehole 130. In such an embodiment, the IA 102 would still be fired via the wireless MI signal, but the temporary wires could be used for high band-width diagnostics after deployment and before firing. Two-way communications via the temporary wire could be performed during or after magnetic communication with the in-hole IAs 102, in which case the diagnostic information could include magnetic field strength and signal-to-noise ratio. The temporary wires could also be used to "switch on" the in-hole device in cases where the IA 102 is dormant between deployment and switching on (this would save electrical energy (in the battery) and extend the life of the IA 102 in the borehole). Although this option may seem suitable, leg wires in a borehole are often the most vulnerable component of an initiating system. Failure to communicate with an in-hole IA 102 via temporary wires could indicate the in-hole IA 102 is defective or simply that the wires have failed. The WEBS 100 described herein provides the wireless back link 106 to the ERS 108, and the wireless back link 106 is at less risk of damage than temporary leg wires.

The WEBS 100 may have one or more of the following advantages compared to existing devices and uni-directional wireless systems for the commercial detonator market:
- post-deployment, the IA 102 may be interrogated for its status, and the IA 102 may communicate its status, and/or any errors, to the user;
- the (wireless) back link 106 allows for avoidance of failures that might be caused by damage to wires that would otherwise extend along and/or between the boreholes, or around the site;
- the more complex (i.e., relatively information-dense) data stream imparting timing/firing information, etc. may be provided by magnetic induction, whilst a confirmatory signal is transmitted at low-frequency RF, thus high-energy transmissions to the sub-surface IA 102 may be powered on the surface, whilst short, low-power, confirmatory data streams can be transmitted from the sub-surface using low-frequency RF; and
- network communication with the IA 102 using existing commercially available communications protocols (e.g., procedures used with the i-kon™ detonators from Orica) may be maintained if the back link 106 is two-way.

Interpretation

Many modifications will be apparent to those skilled in the art without departing from the scope of the present invention.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

The claims defining the invention are as follows:

1. An initiator apparatus (IA) for blasting, the IA including:
    a housing configured to allow insertion and burial of the IA in a borehole
    a magnetic receiver configured to receive a through the earth (TTE) magnetic communication signal representing a command from a base station;
    a blasting controller, in electrical communication with the magnetic receiver, configured to generate response data in response to the command; and
    an electromagnetic (EM) transmitter system (ETS), in electrical communication with the blasting controller, configured to transmit the response data for the base station using a TTE electromagnetic (EM) signal from in the borehole through the earth to an electromagnetic receiver system (ERS) that detects the TTE EM signal, wherein the ETS is a radio-frequency (RF) source and the EM signal is an RF signal.

2. The IA of claim 1, wherein the blasting controller is configured to determine the command from the magnetic communication signal.

3. The IA of claim 1, wherein the blasting controller is configured to generate the response data to include any of the following:
    acknowledgement data representing acknowledgement of receipt of the command at the IA;
    receipt time data representing when the command was received by the IA;
    status data representing a current state of a state machine in the IA;
    battery data representing one or more measures of remaining electrical power stored in the IA;
    error data representing error codes generated by the IA;
    condition data representing a condition of the IA;
    performance data representing performance measures of the IA;
    environment data from monitoring an environment of the IA; and
    identifier (ID) data representing an identifier of the IA.

4. The IA of claim 1, wherein the EM signal includes a preselected transmission frequency, selected to be unique for the IA.

5. The IA of claim 1, wherein the EM signal includes a pattern of preselected transmission frequencies selected to be unique for the IA.

6. The IA of claim 5, wherein the pattern includes hopping between different transmission frequencies at respective different times.

7. The IA of claim 1, wherein the ETS includes an antenna in a main body of the IA.

8. The IA of claim 1, wherein the ETS includes an antenna connected by a cable to a main body of the IA.

9. The IA of claim 1, wherein a magnetic field at the location of the IA is modulated using a modulation scheme to represent the magnetic communication signal.

10. The IA of claim 1, wherein the IA includes an EM receiver for receiving a return TTE EM signal.

11. The IA of claim 1, wherein the IA is configured to delay for a selected response delay time before transmitting the response data.

12. The IA of claim 11, wherein the response delay time is received in the command.

13. A wireless electronic blasting system (WEBS) including the IA as claimed in claim 1.

14. The WEBS of claim 13, including a magnetic field generator for generating the TTE magnetic communication signal.

15. A method of blasting including the steps of:
receiving a through the earth (TTE) magnetic communication signal representing a command for an initiator apparatus (IA) buried in a borehole from a base station;
generating, by the IA, response data in response to the command; and
transmitting the response data for the base station using a TTE electromagnetic (EM) signal from in the borehole through the earth to an electromagnetic receiver system (ERS) that detects the TTE EM signal, wherein the EM signal is an RF signal.

16. The method of claim 15, including the step of determining, by the IA, the command from the magnetic communication signal.

17. The IA of claim 1, wherein the RF signal includes one or more frequencies between 20 kHz and 70 kHz.

18. The method of claim 12, wherein the RF signal includes one or more frequencies between 20 kHz and 70 kHz.

\* \* \* \* \*